US012767866B2

(12) United States Patent
Zhang et al.

(10) Patent No.: US 12,767,866 B2
(45) Date of Patent: Oct. 20, 2026

(54) UV CURABLE ADHESIVE COMPOSITION AND ADHESIVE FILM, ADHESIVE TAPE, AND BONDING COMPONENT COMPRISING THEREOF

(71) Applicant: 3M INNOVATIVE PROPERTIES COMPANY, St. Paul, MN (US)

(72) Inventors: Lijing Zhang, Shanghai (CN); Shijing Cheng, Woodbury, MN (US); Eric George Larson, Lake Elmo, MN (US); Wei Cui, Shanghai (CN); Lin Yang, Shanghai (CN)

(73) Assignee: 3M Innovative Properties Company, St. Paul, MN (US)

(*) Notice: Subject to any disclaimer, the term of this patent is extended or adjusted under 35 U.S.C. 154(b) by 990 days.

(21) Appl. No.: 17/597,962

(22) PCT Filed: Aug. 5, 2020

(86) PCT No.: PCT/CN2020/107070
§ 371 (c)(1),
(2) Date: Jan. 31, 2022

(87) PCT Pub. No.: WO2021/023217
PCT Pub. Date: Feb. 11, 2021

(65) Prior Publication Data

US 2022/0340793 A1 Oct. 27, 2022

(30) Foreign Application Priority Data

Aug. 7, 2019 (CN) ......................... 201910727939.0

(51) Int. Cl.

| | |
|---|---|
| ***C09J 163/00*** | (2006.01) |
| ***C08K 9/10*** | (2006.01) |
| ***C09J 7/40*** | (2018.01) |
| ***C09J 11/08*** | (2006.01) |
| ***C09J 133/08*** | (2006.01) |

(52) U.S. Cl.
CPC ............... *C09J 163/00* (2013.01); *C08K 9/10* (2013.01); *C09J 7/40* (2018.01); *C09J 11/08* (2013.01); *C09J 133/08* (2013.01); *C09J 2203/326* (2013.01); *C09J 2301/408* (2020.08); *C09J 2301/416* (2020.08)

(58) Field of Classification Search
CPC .............. C08F 220/14; C08F 220/1804; C08F 220/20; C08F 220/325; C08G 59/68; C08K 5/053; C08K 9/10; C08L 33/068; C08L 51/04; C08L 63/00; C08L 71/00; C08L 71/02; C09J 11/08; C09J 133/066; C09J 133/068; C09J 133/08; C09J 163/00; C09J 2203/326; C09J 2301/408; C09J 2301/416; C09J 2421/00; C09J 2433/00; C09J 2463/00; C09J 7/10; C09J 7/40
See application file for complete search history.

(56) References Cited

U.S. PATENT DOCUMENTS

| | | | | |
|---|---|---|---|---|
| 4,173,476 | A | 11/1979 | Smith | |
| 4,256,828 | A | 3/1981 | Smith | |
| 4,846,905 | A * | 7/1989 | Tarbutton | C08G 59/686 528/92 |
| 5,059,701 | A | 10/1991 | Keipert | |
| 5,191,101 | A | 3/1993 | Palazzotto | |
| 5,252,694 | A | 10/1993 | Willett | |
| 5,693,714 | A * | 12/1997 | Bauman | C08L 23/06 525/169 |
| 5,721,289 | A * | 2/1998 | Karim | C08G 59/68 522/66 |
| 6,509,128 | B1 * | 1/2003 | Everaerts | G03G 9/08 430/97 |
| 6,790,310 | B2 | 9/2004 | Nakasuga | |
| 8,309,633 | B2 * | 11/2012 | Burns | C08L 51/04 523/440 |
| 11,845,885 | B2 * | 12/2023 | Schmid | C09J 5/00 |
| 2010/0016494 | A1 | 1/2010 | Burns et al. | |
| 2014/0319497 | A1 | 10/2014 | Cho | |
| 2016/0376435 | A1 | 12/2016 | Hagenbucher | |

FOREIGN PATENT DOCUMENTS

| | | |
|---|---|---|
| CN | 102952503 | 3/2013 |
| CN | 104592923 | 5/2015 |
| CN | 107513247 | 12/2017 |
| CN | 109233648 A | 1/2019 |
| WO | WO2016-195970 | 12/2016 |
| WO | 2018/022555 A1 | 2/2018 |
| WO | WO2018-153985 | 8/2018 |

OTHER PUBLICATIONS

Machine translation of CN 102952503, Wu et al Mar. 6, 2013 (Year: 2013).*
Machine translation of CN 109233648, Liu et al, Jan. 18, 2019 (Year: 2019).*
https://www.kaneka.be/sites/default/files/uploads/tds/hppd/TDS_KaneAce_M521.pdf.*
International Search Report for PCT International Application No. PCT/CN2020/107070, mailed on Nov. 10, 2020, 4 pages.

* cited by examiner

*Primary Examiner* — Sanza L. McClendon
(74) *Attorney, Agent, or Firm* — Julie Lapos-Kuchar

(57) ABSTRACT

Disclosed are a UV curable adhesive composition, an adhesive tape comprising the UV curable adhesive composition, an adhesive film formed by UV curing of the adhesive composition, and a corresponding bonding member. The UV curable adhesive composition and the adhesive tape comprising the UV curable adhesive composition have a hybrid system of reactive polyacrylate/epoxy resin/core-shell rubber particles/hydroxy-containing compound, wherein a cationic photoinitiator is used to initiate curing of the epoxy resin.

20 Claims, No Drawings

UV CURABLE ADHESIVE COMPOSITION AND ADHESIVE FILM, ADHESIVE TAPE, AND BONDING COMPONENT COMPRISING THEREOF

CROSS REFERENCE TO RELATED APPLICATIONS

This application is a national stage filing under 35 U.S.C. 371 of PCT/CN2020/107070, filed Aug. 5, 2020, which claims the benefit of Chinese Patent Application No. 201910727939.0, filed Aug. 7, 2019, the disclosure of which is incorporated by reference in its/their entirety herein.

TECHNICAL FIELD

The present disclosure relates to the field of adhesives, and particularly to a UV curable adhesive composition and an adhesive tape comprising the UV curable adhesive composition, an adhesive film formed by UV curing of the adhesive composition, and a corresponding bonding component.

BACKGROUND

With the miniaturization of electronic devices, appropriate bonding adhesive tapes are needed to bond small components. Because of the small bonding area, bonding adhesive tapes are required to have higher bonding strength than conventional pressure-sensitive adhesive tapes. UV initiated bonding adhesive tapes have a promising future in electronic applications and can provide semi-structural or structural bonding strength. At the same time, compared with liquid structural adhesives, when not cured, UV curable adhesive tapes or adhesive films have the following advantages: mold cutting ability, providing initial strength, non-spillage, accurate thickness, and so on.

An important bonding performance index of the bonding adhesive tapes is the peel force after curing. In addition to a certain peel strength, the bonding adhesive tapes must also have a certain overlap shear strength. In addition, the application of bonding adhesive tapes in the electronic field also requires that bonding adhesive tapes have good impact resistance after bonding. When existing UV curable adhesive tapes are applied to electronic devices, because they cannot have both good peel strength and overlap shear strength at the same time, the impact resistance thereof is low, and problems such as a decrease in the adhesiveness of the bonding adhesive tapes after impact on the apparatus or coming apart while in use may occur, impacting the stability and service life of electronic products.

Therefore, in order to meet the application requirements in the electronic field, it is necessary to provide a bonding material having both good peel strength and overlap shear strength at the same time, as well as good impact resistance.

SUMMARY

The present invention aims to provide the following: a UV curable adhesive composition having at least both good peel strength and overlap shear strength at the same time and also having good impact resistance; and an adhesive tape comprising the UV curable adhesive composition, an adhesive film formed by UV curing of the adhesive composition, and a corresponding bonding component.

The present invention is based on the following findings of the inventor: in the UV curable adhesive tape using a cationic photoinitiator, the use of core-shell rubber particles as a toughening agent can improve the comprehensive adhesive performance of the adhesive tape after UV curing, and can also improve the high-frequency impact resistance of the adhesive tape. In one aspect, the present disclosure provides a UV curable adhesive composition, comprising: 20 to 72 parts by weight of reactive polyacrylate; 15 to 63 parts by weight of epoxy resin; 0.5 to 21 parts by weight of core-shell rubber particles; 1.4 to 15 parts by weight of a hydroxy-containing compound; and an effective amount of a cationic photoinitiator.

According to some particular embodiments of the present disclosure, the epoxy resin comprises a liquid epoxy resin.

According to some particular embodiments of the present disclosure, the content of the liquid epoxy resin is 15 to 42 parts by weight.

According to some particular embodiments of the present disclosure, the epoxy resin further comprises a solid epoxy resin.

According to some particular embodiments of the present disclosure, the solid epoxy resin accounts for greater than 10 wt % based on the total weight of the epoxy resin.

According to some particular embodiments of the present disclosure, the content of the solid epoxy resin is 8 to 29 parts by weight.

According to some particular embodiments of the present disclosure, the content of the liquid epoxy resin is less than or equal to 32 parts by weight.

According to some particular embodiments of the present disclosure, the glass transition temperature of the reactive polyacrylate is −35 to 10° C.

According to some particular embodiments of the present disclosure, the glass transition temperature of the reactive polyacrylate is −20 to 0° C.

According to some particular embodiments of the present disclosure, the content of the cationic photoinitiator is 0.5 to 1 part by weight.

According to some particular embodiments of the present disclosure, cores of the core-shell rubber particles comprise one or a plurality of polybutadiene, styrene-butadiene rubber, polyacrylate or polysiloxane.

According to some particular embodiments of the present disclosure, shells of the core-shell rubber particles comprise one or a plurality of acrylic polymers or acrylic copolymers.

According to some particular embodiments of the present disclosure, the UV curable adhesive composition comprises: 20 to 72 parts by weight of the reactive polyacrylate, the glass transition temperature of the reactive polyacrylate being −20 to 0° C.; 15 to 32 parts by weight of a liquid epoxy resin; 8.5 to 29 parts by weight of a solid epoxy resin, wherein the solid epoxy resin accounts for greater than 20 wt % based on the total weight of the epoxy resin; 1.4 to 15 parts by weight of the hydroxy-containing compound; 0.5 to 1 part by weight of the cationic photoinitiator; and 0.5 to 21 parts by weight of the core-shell rubber particles.

According to another aspect of the present disclosure, a UV curable adhesive tape is provided, comprising at least one UV curable adhesive composition layer comprising the UV curable adhesive composition according to present disclosure.

According to some particular embodiments of the present disclosure, the UV curable adhesive tape further comprises a release paper or release film provided on one or two surfaces of the UV curable adhesive composition layer.

According to a further aspect the present disclosure, a UV cured adhesive film is provided, the UV cured adhesive film comprising an adhesive composition layer formed after UV curing of the UV curable adhesive composition according to present disclosure.

According to yet another aspect of the present disclosure, there is provided a bonding component comprising the UV cured adhesive film of the present disclosure and a part bonded thereto. After curing, the UV curable adhesive composition and the UV curable adhesive tape provided in the present disclosure have both good peel strength and overlap shear strength at the same time, as well as good impact resistance.

DETAILED DESCRIPTION

The present disclosure provides a UV curable adhesive composition and a UV curable adhesive tape. The UV curable adhesive composition and the UV curable adhesive tape have a hybrid system of reactive polyacrylate/epoxy resin/core-shell rubber particles, wherein a cationic photoinitiator is used to initiate curing of the epoxy resin. This photoinitiator is induced by ultraviolet light, and even if an ultraviolet light source is removed, the photoinitiator can, at room temperature, still continue to initiate the reaction of an epoxy group, so as to finish curing (namely, living polymerization). The present disclosure further provides a UV cured adhesive film, the UV cured adhesive film comprising an adhesive composition layer formed after UV curing of the UV curable adhesive composition mentioned above.

The "UV curable" adhesive composition herein refers to an adhesive that can be defined by at least two features as follows: (i) is the adhesive composition is viscous at room temperature initially and can adhere to an object surface without the need for extra heating; (ii) after the adhesive composition is adhered to the object surface, further chemical crosslinking can be triggered by ultraviolet and visible light.

Herein, the term (methyl)acrylic acid refers to acrylic acid, methacrylic acid, or both. Similarly, the term (methyl) acrylate refers to acrylate, methacrylate, or both. (Methyl) acrylate polymers refer to polymers where polymerization monomers are mainly acrylic acid/ester and/or methacrylic acid/ester.

Tg of the polymer can be determined by a method commonly used in the art such as DSC, or can be calculated through the FOX equation. The FOX equation is used to describe the relationship between Tg of a copolymer and Tg of a homopolymer constituting the component of the copolymer. For example, for a copolymer constituted by monomer units A, B, C and the like, Tg thereof can be represented by following formula:

$$\frac{1}{Tg} = \frac{W_A}{Tg_A} + \frac{W_B}{Tg_B} + \frac{W_C}{Tg_C} + \ldots$$

wherein

Tg is Tg of the copolymer;

WA, WB, WC, and the like are mass fractions of monomer units A, B, C and the like, respectively; and TgA, TgB, TgC, and the like are Tg of the A homopolymer, B homopolymer, C homopolymer and the like, respectively.

Unless stated otherwise, all parts, percentages, ratios, concentrations and the like in the examples and in the rest part of the description are given by weight, and all agents used in the embodiments are obtained from or available from general chemical suppliers or can be synthesized through conventional methods. Unless stated otherwise, terms "solid" and "liquid," when used for an epoxy resin, refer to phases of the resin that is not cured under the standard temperature and pressure, such as the phase of the resin recorded in MSDS of the manufacturer.

The UV curable adhesive composition and the UV curable adhesive tape are explained in more detail below.

In one aspect, the present disclosure provides a UV curable adhesive composition, comprising: 20 to 72 parts by weight of the reactive polyacrylate; 15 to 63 parts by weight of the epoxy resin; 0.5 to 21 parts by weight of the core-shell rubber particles; 1.4 to 15 parts by weight of a hydroxy-containing compound; and an effective amount of the cationic photoinitiator.

a) Reactive Polyacrylate

The UV curable adhesive composition provided in the present disclosure comprises reactive polyacrylate, i.e., polyacrylate carrying a reactive functional group. Generally, the reactive functional group may be an epoxy group, or alternatively a group such as carboxy or hydroxy. Due to the use of a cationic photoinitiation system, the reactive functional group of the reactive polyacrylate suitable for the present disclosure is preferably a reactive functional group containing no nitrogen, and preferably a reactive functional group containing no sulfur.

Herein, polyacrylate includes homopolymers of polyacrylate and polymethacrylate, or copolymers comprising at least one polyacrylate or polymethacrylate blocks. For example, polyacrylate may include C1-C10 alkyl polyacrylate, C3-C8 cycloalkyl polyacrylate, C6-C12 aryl polyacrylate, C1-C10 alkyl polymethacrylate, C3-C8 cycloalkyl polymethacrylate, or C6-C12 aryl polymethacrylate; polyacrylate may also include a copolymer of blocks of at least one C1-C10 alkyl polyacrylate, C3-C8 cycloalkyl polyacrylate, C6-C12 aryl polyacrylate, C1-C10 alkyl polymethacrylate, C3-C8 cycloalkyl polymethacrylate or C6-C12 aryl polymethacrylate, wherein C1-C10 alkyl, C3-C8 cycloalkyl and C6-C12 aryl may be substituted by one or a plurality of substituents; the substituent may be independently selected from the group consisting of hydroxy, carboxy, and epoxy; and the substituent may also be C3-C8 cycloalkyl, C6-C12 aryl or C6-C12 aryloxy optionally substituted by hydroxy, carboxy, or epoxy.

The reactive polyacrylate carrying a reactive functional group may be prepared by free-radical copolymerization or copolymerization of one or a plurality of acrylate monomers. These acrylate monomers should also have better compatibility with the epoxy resin. In addition, the acrylate may further comprise one or a plurality of epoxy, carboxy, or hydroxy groups.

According to some particular embodiments of the present disclosure, reactive polyacrylate may be obtained by free-radical polymerization or copolymerization reaction of one or a plurality of monomers selected from the group consisting of: C1-C10 alkyl acrylate, C3-C8 cycloalkyl acrylate, C6-C12 aryl acrylate, C1-C10 alkyl methacrylate, C3-C8 cycloalkyl methacrylate and C6-C12 aryl methacrylate, wherein C1-C10 alkyl, C3-C8 cycloalkyl and C6-C12 aryl may be substituted by one or a plurality of substituents. The substituent may be independently selected from the group consisting of hydroxy, carboxy, and epoxy; and the substituent may also be C3-C8 cycloalkyl, C6-C12 aryl or C6-C12 aryloxy optionally substituted by hydroxy, carboxy or epoxy. Examples of C1-C10 alkyl acrylate include, but are not limited to one or a plurality of methyl acrylate, ethyl acrylate, propyl acrylate, isopropyl acrylate, butyl acrylate, isobutyl acrylate, t-butyl acrylate, and hexyl acrylate. Examples of C1-C10 alkyl methacrylate include, but are not limited to methyl methacrylate, ethyl methacrylate, propyl methacrylate, isopropyl methacrylate, butyl methacrylate, isobutyl methacrylate, t-butyl methacrylate, or hexyl methacrylate and the like. Examples of C3-C8 cycloalkyl acrylate include, but are not limited to cyclopropyl acrylate, cyclobutyl acrylate, cyclopentyl acrylate, or cyclohexyl acrylate, and the like. Examples of C3-C8 cycloalkyl methacrylate include, but are not limited to cyclopropyl methacrylate, cyclobutyl methacrylate, cyclopentyl methacrylate, or cyclohexyl methacrylate, and the like. Examples of C6-C12 aryl acrylate include, but are not limited to phenyl acrylate, or naphthyl acrylate, and the like. Examples of C6-C12 aryl methacrylate include, but are not limited to phenyl methacrylate, or naphthyl methacrylate, and the like. According to some particular embodiments of the present disclosure, C1-C10 alkyl is preferably C1-C6 alkyl, C3-C8 cycloalkyl is preferably C3-C6 cycloalkyl, and C6-C12 aryl is preferably C6-C10 aryl.

Selectable examples of acrylate monomers include, but are not limited to butyl acrylate (BA), methyl acrylate (MA), phenoxyethyl acrylate (PEA), or (2-hydroxy-3-phenoxypropyl)acrylate (HPPA) and the like. Selectable examples of reactive monomers carrying epoxy include, but are not limited to glycidyl methacrylate (GMA), or (3,4-epoxycyclohexylmethyl)acrylate (ECA) and the like.

Based on the total amount of polyacrylate being 100 wt %, reactive groups such as epoxy, hydroxy, or carboxy are generally synthesized in laboratories by polymerization of monomers containing these reactive groups, and the proportion of the monomers based on polyacrylate is 1.5-30 wt %, or 2-25 wt %, or 6-20 wt %. If the content having reactive groups such as epoxy, hydroxy or carboxy is too low, then it is difficult to form an interpenetrating polymer network (IPN), thereby influencing the temperature tolerance of the UV curable adhesive compositions; if the content having monomers with reactive groups such as epoxy, then hydroxy or carboxy is too high, and the crosslinking density of the UV curable adhesive composition may be too high, thereby making the composition brittle.

The above-mentioned reactive polyacrylate carrying a reactive functional group can be synthesized by a conventional method of solvent free-radical polymerization. Solvents that may be used include but are not limited to ester, alcohol, ketone, carboxylic acid, aliphatic hydrocarbon, cyclane, haloalkane, or aromatic hydrocarbon, and the like; examples of the solvents include but are not limited to one or a plurality of ethyl acetate, n-butanol, acetone, acetic acid, benzene, toluene, ethylbenzene, isopropylbenzene, t-butylbenzene, heptane, cyclohexane, chloro-n-butane, bromo-n-butane, and iodo-n-butane, and the like. Initiators that can be used in the process of synthesizing the reactive polyacrylate include but are not limited to azo initiators and peroxy initiators, and examples thereof include but are not limited to azodiisobutyronitrile (AIBN), azobisisoheptonitrile (ABVN), 2,2'-azo-bi(2-methylbutyronitrile) (AMBN), benzoyl peroxide (BPO), or persulfate, and the like.

According to some particular embodiments of the present disclosure, in the reactive polyacrylate in the UV curable adhesive composition, the reactive polyacrylate carrying a reactive functional group has a lower limit of the content of 20 parts by weight, or at least 21 parts by weight, or at least 36 parts by weight; and an upper limit of the content of reactive polyacrylate is 85 parts by weight, or at most 72 parts by weight, or at most 70 parts by weight, or at most 45 parts by weight. When the content of reactive polyacrylate is in the above-mentioned range, the reactive polyacrylate has good compatibility with the epoxy resin and core-shell rubber particles. Moreover, the UV curable adhesive composition containing reactive polyacrylate of this content has good comprehensive bonding strength and good toughness after curing.

According to some particular embodiments of the present disclosure, in the UV curable adhesive composition, the above-mentioned reactive polyacrylate carrying a reactive functional group has a lower limit of the glass transition temperature of −35° C., or −32° C., or −30° C., or −20° C.; and the upper limit of the glass transition temperature of reactive polyacrylate is 10° C., or 0° C., or −10° C. When the glass transition temperature of reactive polyacrylate is in the above-mentioned range, the reactive polyacrylate has good compatibility with the core-shell rubber. The UV curable adhesive composition containing reactive polyacrylate within the glass transition temperature range can have both good peel strength and overlap shear strength at the same time, and also have good impact resistance after curing.

Note that when the content of reactive polyacrylate in the UV curable adhesive composition is too low, the content of the epoxy resin is correspondingly too high, and the peel force and impact resistance of the cured adhesive may be worse.

b) Epoxy Resin

The UV curable adhesive composition provided in the present disclosure contains at least one epoxy resin. Due to the use of a cationic photoinitiator, an epoxy resin preferably comprising no nitrogen-containing functional group is selected as the epoxy resin. According to some particular embodiments of the present disclosure, the epoxy resin contains two or more epoxy groups in the molecule. Specifically, well-known epoxy resins obtained by reaction of a polyphenol such as bisphenol A, bisphenol F, bisphenol S, hexahydrobisphenol A, tetramethyl bisphenol A, diaryl bisphenol A, and tetramethyl bisphenol F with epichlorohydrin may be used; examples of the well-known epoxy resins include glycidyl ether, cycloaliphatic epoxy resins, epoxidized polyolefins, and the like. In the present disclosure, the liquid epoxy resin refers to an epoxy resin that is a liquid at room temperature. According to some particular embodiments of the present disclosure, the liquid epoxy resin may be a liquid epoxy resin having an epoxy equivalent of 176 to 330 g/eq. For example, examples of the liquid epoxy resin include but are not limited to liquid epoxy resins derived from bisphenol A, such as EPOKUKDO YD128 (epoxy equivalent: approximately 187) commercially available from Kunshan (Kudko) Chemical (Korea); NEPL-128 (epoxy equivalent: approximately 184-190) commercially available from Taiwan Nanya Resin Co., Ltd.; DER331 (epoxy equivalent: approximately 182-192) from Dow Chemical Corporation; E-51 (epoxy equivalent: approximately 185-210) from Blue Star Material (Wuxi) Co., Ltd.; or EPON 828 (epoxy equivalent: approximately 185-192) from Shell Oil.

The epoxy resin in the present disclosure is preferably a mixture comprised of a liquid epoxy resin and a solid epoxy resin. The solid epoxy resin refers to an epoxy resin that is a solid at room temperature. According to some particular embodiments of the present disclosure, the solid epoxy resin may be a solid epoxy resin having an epoxy equivalent of 450 to 800 g/eq. For example, examples of the solid epoxy resin include, but are not limited to solid epoxy resins derived from bisphenol A, such as NEPS-901 (epoxy equivalent: approximately 450-500) commercially available from Taiwan Nanya Resin Co., Ltd., EPOKUKDO YDO11

(epoxy equivalent: approximately 450-500) commercially available from Korea Kudko Chemical (Kunshan) Co., Ltd., E-20 (epoxy equivalent: approximately 440-550) from Blue Star Material (Wuxi) Co., Ltd., DER661 (epoxy equivalent: approximately 500-560) from Dow Chemical Corporation, or EPON1001 (epoxy equivalent: approximately 525-550) from Shell Oil.

The inventor has found that, when the components of the epoxy resin are a mixture comprised of a liquid epoxy resin and a solid epoxy resin; the amount of the liquid epoxy resin is 15 to 42 parts by weight, or 21 to 32 parts by weight in the composition; and the amount of the solid epoxy resin is 8.5 to 29 parts by weight, or 10 to 15 parts by weight, or 10 to 13 parts by weight, the solid epoxy resin and the liquid epoxy resin can improve the bonding strength through a synergistic effect.

When the lower limit of the weight ratio of the solid epoxy resin based on the total weight of the epoxy resin is greater than 10 wt %, or greater than 20 wt %, or greater than 25 wt %; and when the upper limit of the weight ratio of the solid epoxy resin based on the total weight of the epoxy resin is less than 50 wt %, the solid epoxy resin and the liquid epoxy resin can balance the bonding strength and tensile impact through a synergistic effect.

The inventor has also found that, when the total amount of the epoxy resin components is too high, the peel force and impact resistance of the cured adhesive are significantly degraded.

c) Cationic Photoinitiator

Although the photoinitiator is present in a small amount in the UV curable adhesive composition of the hybrid system of reactive polyacrylate carrying a reactive functional group/epoxy resin, the photoinitiator has a significant effect on the cure speed and storage stability of the UV curable adhesive composition.

The cationic photoinitiator may be selected from the group consisting of the following compounds: diaryliodonium salts, triarylsulfonium salts, alkylsulfonium salts, iron arene salts, sulfonyloxy ketones, and triaryl siloxyethers. In some embodiments, the following compounds are used: triarylsulfonium hexafluorophosphate salts or hexafluoroantimonate salts, sulfonium hexafluoroantimonate salts, sulfonium hexafluorophosphate salts, and iodonium hexafluorophosphate salts.

Onium salt photoinitiators suitable for the present disclosure include iodonium and sulfonium complex salts. Useful aromatic iodonium complex salts include a salt of a general formula as follows:

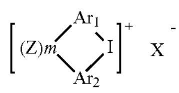

$Ar_1$ and $Ar_2$ are identical or different, each comprising aryl having about 4 to 20 carbon atoms. Z is selected from the group consisting of oxygen, sulfur, carbon-carbon bonds:

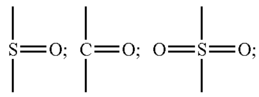
and
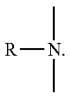

R may be aryl (having about 6 to 20 carbon atoms, such as phenyl) or acyl (having about 2 to 20 carbon atoms, such as acetyl or benzoyl); and

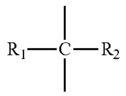

$R_1$ and $R_2$ are selected from the group consisting of hydrogen, alkyl having about 1 to 4 carbon atoms, and alkenyl having about 2 to 4 carbon atoms.

m is 0 or 1; and

X has a chemical formula of $DQ_n$, wherein D is a metal of Groups IB to VIII or a nonmetal of Groups IIIA to VA in the Periodic Table of Elements; Q is a halogen atom; and n is an integer from 1 to 6. The metal is preferably copper, zinc, titanium, vanadium, chromium, magnesium, manganese, iron, cobalt, or nickel, and the nonmetal is preferably boron, aluminum, antimony, tin, arsenic and phosphorus. Halogen Q is preferably chlorine or fluorine. Suitable examples of anions include but are not limited to $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{2-}$, $ZrF_6^-$, and $CF_3SO_3^-$. The anions are preferably $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$ and $SbF_5OH^-$.

More preferably, $Ar_1$ and $Ar_2$ are selected from the group consisting of phenyl group, thienyl group, furanyl group, and pyrazolyl group. The $Ar_1$ and $Ar_2$ groups may optionally comprise one or a plurality of condensed benzocycles (e.g., naphthyl, benzothienyl, dibenzothienyl, benzofuranyl, and dibenzofuranyl). The aryl groups may also be substituted by one or a plurality of non-alkaline groups as required, if they do not substantially react with epoxy compounds and hydroxy functional groups.

Aromatic sulfonium complex salt initiators suitable for the present disclosure may be represented by the following general formula:

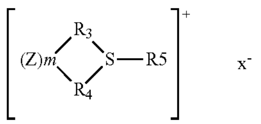

wherein $R_3$, $R_4$, and $R_5$ are identical or different, provided that at least one of $R_3$, $R_4$ and $R_5$ is aryl. $R_3$, $R_4$ and $R_5$ may be selected from the group consisting of aromatic portions comprising about 4 to 20 carbon atoms (e.g., substituted and unsubstituted phenyl, thienyl and furyl) and alkyl comprising about 1 to 20 carbon atoms. $R_3$, $R_4$ and $R_5$ are each preferably an aromatic portion; and Z, m and X are all those as defined for the iodonium complex salt above.

If $R_3$, $R_4$ and $R_5$ are aromatic groups, they may optionally comprise one or a plurality of condensed benzocycles (e.g., naphthyl, benzothienyl, dibenzothienyl, benzofuranyl, and dibenzofuranyl). The aryl groups may also be substituted by one or a plurality of non-alkaline groups as required, if they do not substantially react with epoxy compounds and hydroxy functional groups.

Sulfonium salts useful in the present disclosure comprise triaryl substituted salts, specifically such as triphenyl sulfonium hexafluoroantimonate and p-phenyl(thiophenyl)biphenyl sulfonium hexafluoroantimonate. Other sulfonium salts useful in the present disclosure have been described in U.S. Pat. Nos. 4,256,828 and 4,173,476.

Another type of photoinitiator suitable for the present disclosure comprises photoactivatable organic metal complex salts, such as those described in U.S. Pat. Nos. 5,059,701; 5,191,101; and 5,252,694. These organic metal cationic salts have a general formula as follows:

$$[(L_1)(L_2)Mm]e^+X^-$$

wherein Mm represents an element selected from the periodic table IVB, VB, VIB, VIIB, and VIII, and is preferably Cr, Mo, W, Mn, Re, Fe and Co; $L_1$ represents 0, 1 or 2 ligands that contribute pi electrons, wherein the ligands may be identical or different, each of which may be selected from the group consisting of substituted and unsubstituted alicyclic and cyclic unsaturated compound substituted and unsubstituted carbocyclic aromatics and heterocyclic aromatics. Each of the compounds may contribute 2 to 12 pi electrons to a valence shell of the metal atom M. $L_1$ is preferably selected from the group consisting of substituted and unsubstituted η3-allyl, η5-cyclopentadienyl and η7-cycloheptane compounds, and η6-aromatics from η6-benzene and substituted η6-benzene compounds (e.g., xylene) and compounds with 2-4 fused rings, each ring being able to contribute 3 to 8 pi electrons to the valence shell of metal atom M.

$L_2$ represents 0, or 1 to 3 ligands that contribute an even number of pi electrons, wherein the ligands may be identical or different, each of which may be selected from the group consisting of carbon monoxide, nitrosonium, triphenylphosphine, antimony triphenyl, and phosphorus, arsenic and antimony derivatives, provided that the total electrical charge contributed to Mm by $L_1$ and $L_2$ result in e net residual positive charge of the complex.

e is an integer of 1 or 2, the residual charge in coordination with cations; and X is a halogen-containing anion in coordination, as stated above.

Examples of suitable organic metal coordinated cationic salts serving as photoactivatable catalysts in the present disclosure include, but are not limited to the following:

[(η6-benzene)(η5-cyclopentadienyl)Fe]$^+$[$SbF_6$]$^-$,
[(η6-toluene)(η5-cyclopentadienyl)Fe]$^+$[$AsF_6$]$^-$,
[(η6-xylene)(η5-cyclopentadienyl)Fe]$^+$[$SbF_6$]$^-$,
[(η6-isopropylbenzene)(η5-cyclopentadienyl)Fe]$^+$[$SbF_6$]$^-$,
[(η6-xylene (mixed isomer))(η5-cyclopentadienyl)Fe]$^+$[$SbF_6$]$^-$,
[(η6-xylene (mixed isomer))(η5-cyclopentadienyl)Fe]$^+$[$PF_6$]$^-$,
[(η6-o-xylene)(η5-cyclopentadienyl)Fe]$^+$[$CF_3SO_3$]$^-$,
[(η6-m-xylene)(η5-cyclopentadienyl)Fe]$^+$[$BF_4$]$^-$,
[(η6-1,3,5-trimethylbenzene)(η5-cyclopentadienyl)Fe]$^+$[$SbF_6$]$^-$,
[(η6-hexamethylbenzene)(η5-cyclopentadienyl)Fe]$^+$[$SbF_5OH$]$^-$,
[(η6-fluorene)(η5-cyclopentadienyl)Fe]$^+$[$SbF_6$]$^-$.

In one example of the present disclosure, the desired organic metal coordinated cationic salt comprises one or a plurality of the following compounds:

[(η6-xylene (mixed isomer))(η5-cyclopentadienyl)Fe]$^+$[$SbF_6$]$^-$,
[(η6-xylene (mixed isomer))(η5-cyclopentadienyl)Fe]$^+$[$PF_6$]$^-$,
[(η6-xylene)(η5-cyclopentadienyl)Fe]$^+$[$SbF_6$]$^-$,
[(η6-1,3,5-trimethylbenzene)(η5-cyclopentadienyl)Fe]$^+$[$SbF_6$]$^-$, Suitable commercially available initiators include, but are not limited to DOUBLECURE1176; 1193 (Double Bond Chemical Ind. Co., Ltd.); and IRGACURE™ 261, a cationic organic metal complex salt (BASF).

In the UV curable adhesive composition provided in the present disclosure, the effective amount of the cationic photoinitiator is 0.02 to 10 parts by weight, preferably 0.5 to 2 parts by weight, and more preferably 0.5 to 1 part by weight. In general, if the content of the cationic photoinitiator is increased, then the cure speed of the UV curable adhesive compositions can be increased. Therefore, if the content of the cationic photoinitiator is too low, then the requirement of UV radiation energy is high and during curing the cure speed is too slow. On the contrary, if the content of the cationic photoinitiator is too high, the requirement of UV radiation energy is low, during curing the cure speed is too high, and the adhesive composition can be cured even under sunlight or a fluorescent lamp (containing a small amount of UV light), thereby influencing the room temperature storage stability of the UV curable adhesive composition.

d) Core-Shell Rubber (CSR) Particles

The core-shell rubber particle refers to a particulate material having a rubber core. A core refers to the internal portion of the core-shell rubber. The core may be a central part forming the core-shell particle or an inner shell area of the core-shell rubber. A shell is a portion of the core-shell rubber located outside the rubber core, and may be one or a plurality of shell portions that usually form the outermost portion of the core-shell rubber particle. The shell material is preferably grafted or crosslinked onto the core, or both. The rubber core may account for 50% to 95% based on the weight of the core-shell rubber particle.

The core of the core-shell rubber suitable for the present invention may be formed by conjugated dienes, e.g., butadiene; low-grade alkyl esters of acrylic acid, e.g., n-butyl acrylate, ethyl ester, isobutyl ester; 2-ethylhexyl ester; or polymers or copolymers of polysiloxane. Specifically, the cores of CSR particles may be one or a plurality of substances selected from the following group consisting of methyl methacrylate butadiene styrene (MBS) monomers, methacrylate-acrylonitrile-butadiene-styrene (MABS) monomers, or combinations thereof. Examples of other compounds that can be used to form the core include ABS (acrylonitrile-butadiene-styrene), ASA (acrylate-styrene-acrylonitrile), acrylic substances, SAEPDM (styrene-acrylonitrile grafted onto the elastomer backbone of an ethylene-acrylic diene monomer), MAS (methacrylic-acrylic rubber styrene) and the like, and mixtures thereof. The size of CSR particles is generally at least 50 nm, commonly from 100 to 300 nm, and the CSR particles are prepared through emulsion polymerization reaction. Kaneka Kane Ace MX series products commercially available from Japan are preferred.

The shell suitable for the core-shell rubber of the present invention may comprise one or a plurality of acrylic polymers or acrylic copolymers. Specifically, the shell of a CSR particle may be formed of acrylic polymers, acrylic copolymers, or combinations thereof. In multiple embodiments, the (polymer) composition forming the shell of the core-shell rubber has sufficient affinity for the epoxy resin and reactive polyacrylate used as a matrix, to allow the core-shell rubber particles to exist as primary particles in the adhesive tape in solid form, and to stably disperse. Preferred CSR particles have polybutadiene rubber cores or styrene butadiene rubber cores (e.g., formed of MBS monomers) and shells formed of acrylic polymers or acrylic copolymers, wherein the core-shell rubber is optionally dispersed in the matrix, and the matrix is preferably selected from the group consisting of aromatic epoxy resins, particularly bisphenol A, F-based diglycidyl ether, and hydroxy compounds.

According to some particular embodiments of the present disclosure, the content of core-shell rubber is 0.5 parts by weight to 21 parts by weight, preferably 0.9 parts by weight to 21 parts by weight, and preferably 3.7 parts by weight to 9 parts by weight. In preferred embodiments, the core-shell rubber is dispersed in an epoxy or polyol medium, and especially in a polyol, the core-shell rubber particles are dispersed more uniformly and have better compatibility with reactive polyacrylate and epoxy resin used as the matrix.

e) Hydroxy-Containing Compounds

The UV curable adhesive composition provided in the present disclosure comprise of hydroxy-containing compounds. The hydroxy-containing compounds include ether or ester derivatives thereof. According to some particular embodiments of the present disclosure, the hydroxy-containing compounds are polyols. When the epoxy group reacts through the cationic mechanism, the hydroxy-containing compound acts as a chain transfer agent, and the hydroxy-containing compound has a good dispersing effect on the core-shell rubber particles, making the core-shell rubber particles more compatible with the epoxy resin and reactive polyacrylate used as the matrix.

According to some particular embodiments of the present disclosure, the polyol includes but is not limited to one or a plurality from the group consisting of polyether polyols and polyester polyols. The polyether polyol includes, but is not limited to one or a plurality from the group consisting of polyether triols and polyether diols. The polyester polyol includes but is not limited to one or a plurality from the group consisting of polyester triols, polyester diols, and bisphenol A polyols. According to some particular embodiments of the present disclosure, the polyol may be selected from TONE 0230 Polyol, VORANOL 230-238 and Varonol 2070, all commercially available from Dow Chemical Corporation, U.S.; and Dianol 285 commercially available from Seppic Corporation, France, etc. According to some particular embodiments of the present disclosure, the polyol is preferably Varonol 2070 commercially available from Dow Chemical, U.S., which is a polyether triol having a molecular weight of 700.

In the UV curable adhesive composition provided in the present disclosure, the content of polyol is generally 1.0 to 18 parts by weight, 1.2 to 16 parts by weight, 1.4 to 15 parts by weight, or 3 to 15 parts by weight, or 3.3 to 11 parts by weight, or 7.2 to 11 parts by weight. Through the addition of a certain amount of polyols, the peel strength and overlap shear strength of the UV curable adhesive composition after curing are enhanced, and the impact resistance is improved.

f) Other Additives

Basic additives may be present in the UV curable adhesive composition to achieve the necessary physical or chemical properties required for specific applications. Adhesion promoters, crosslinkers, tackifying resins, inorganic fillers and the like are included in the present application.

The UV curable adhesive composition may comprise an adhesion promoter. A suitable adhesion promoter can be selected according to the surface to be bonded. The inventor has found that, silane is an additive that improves the adhesion of the UV curable adhesive tape to metal and glass without influencing the UV curing reaction. Epoxy-containing reactive silanes are preferred, such as commercially available Silquest A187 (Momentive Performance Materials).

The UV curable adhesive composition may comprise a crosslinker. Preferred crosslinkers can be reacted and crosslinked with reactive polypropionate and include difunctional or polyfunctional isocyanates, and difunctional or polyfunctional amines. An important criterion for selection of a crosslinker is that the crosslinker has no possible or the lowest possible influence on the UV cationic polymerization reaction.

The UV curable adhesive composition may comprise a tackifying resin. Such as rosin acid, rosin ester, terpene phenolic resin, hydrocarbon resin and Benzofuran indene resin. The type and amount of the tackifiers may have effect on tack, wetting, adhesion strength, and heat resistance performance.

The UV curable adhesive composition may comprise an inorganic filler. For example, fumed silica, aluminium oxide, conductive fillers, et. al. For example, Waker HDK H15, HDK H20, CAB-O-SIL TS-610.

In another aspect, the present disclosure provides a UV curable adhesive tape, comprising at least one UV curable adhesive composition layer which comprises the UV curable adhesive composition provided according to the present disclosure.

This UV curable adhesive tape provided in the present disclosure has structural strength or semi-structural strength, good comprehensive bonding performance and good impact resistance after bonding. In addition, when the UV curable adhesive composition provided in the present disclosure contains an appropriate amount of hydroxy-containing compounds, the prepared UV curable adhesive tape has higher comprehensive bonding strength.

According to some particular embodiments of the present disclosure, the UV curable adhesive tape provided in the present disclosure can be prepared by the following steps: coating the UV curable adhesive composition of the present disclosure in a flowable form onto a substrate layer (e.g., a layer) by a conventional coating method, and then removing the solvent by heating, to thereby form an adhesive film of a certain thickness, so as to obtain the UV curable adhesive tape.

The UV curable adhesive composition used for coating having viscosity that is too high or too low is unfavorable to the coating of the UV curable adhesive composition. A solvent, e.g., an ester, an alcohol, a ketone, a carboxylic acid, an aliphatic hydrocarbon, a cyclane, a haloalkane, an aromatic hydrocarbon, etc., may be added in order to adjust the viscosity. Examples of the solvent include but are not limited to one or a plurality from the group consisting of ethyl acetate, n-butanol, isopropanol, acetone, acetic acid, benzene, toluene, ethylbenzene, isopropylbenzene, t-butylbenzene, heptane, cyclohexane, 1-chlorobutane, 1-bromobutane, and 1-iodobutane.

Useful coating methods include roll knife coating, comma roll coating, dragging blade coating, reverse roll coating, winding bar (Mayer) coating, gravure roll coating, slit-type die extrusion (Die) coating, and the like. Preferable coating methods are comma roll coating and slit-type die extrusion (Die) coating.

According to some particular embodiments of the present disclosure, the thickness of the adhesive layer (thickness of the dried adhesive) may be between 10 and 100 μm.

According to some particular embodiments of the present disclosure, single-sided release paper or release film of a certain thickness may also be provided on one side of the adhesive layer. According to some particular embodiments of the present disclosure, the UV curable adhesive tape may further comprise a release layer, e.g., release paper. The contact between the release layer and the outer surface of the adhesive layer, i.e. the contact on the surface opposite to the contact surface of the adhesive layer and the substrate, can protect the adhesive layer. When in use, the release layer can be peeled off to expose the adhesive layer for use. According to some particular embodiments of the present disclosure, the release layer includes but is not limited to one or a plurality from the group consisting of glass paper, laminated paper, polyester films and polypropylene films.

The following particular embodiments intend to explain the present disclosure exemplarily rather than restrictively.

Particular Embodiment 1 is a UV curable adhesive composition, comprising: 20 to 72 parts by weight of the reactive polyacrylate; 15 to 63 parts by weight of the epoxy resin, wherein the epoxy resin comprises no nitrogen-containing functional group; 0.5 to 21 parts by weight of the core-shell rubber particles; 1.4 to 15 parts by weight of the hydroxy-containing compound; and an effective amount of the cationic photoinitiator.

The hydroxy-containing compound is preferably a polyol.

Particular Embodiment 2 is the UV curable adhesive composition according to embodiments 1, wherein the epoxy resin comprises a liquid epoxy resin.

Particular Embodiment 3 is the UV curable adhesive composition according to Particular Embodiment 2, wherein the content of the liquid epoxy resin is 15 to 42 parts by weight.

Particular Embodiment 4 is the UV curable adhesive composition according to Particular Embodiment 2, wherein the epoxy resin further comprises a solid epoxy resin.

Particular embodiment 5 is the UV curable adhesive composition according to Particular Embodiment 4, wherein the solid epoxy resin accounts for greater than 10 wt % based on the total weight of the epoxy resin.

Particular Embodiment 6 is the UV curable adhesive composition according to Particular Embodiment 5, wherein the content of the solid epoxy resin is 8 to 29 parts by weight.

Particular Embodiment 7 is the UV curable adhesive composition according to Particular Embodiment 6, wherein the content of the liquid epoxy resin is less than or equal to 32 parts by weight.

Particular Embodiment 8 is the UV curable adhesive composition according to any one of Particular Embodiments 1 to 7, wherein the glass transition temperature of the reactive polyacrylate is −35 to 10° C.

Particular Embodiment 9 is the UV curable adhesive composition according to any one of Particular Embodiments 1 to 8, wherein the glass transition temperature of the reactive polyacrylate is −20 to 0° C.

Particular Embodiment 10 is the UV curable adhesive composition according to any one of Particular Embodiments 1 to 9, wherein according to some particular embodiments of the present disclosure, the content of the cationic photoinitiator is 0.5 to 1 part by weight.

Particular Embodiment 11 is the UV curable adhesive composition according to any one of Particular Embodiments 1 to 10, wherein cores of the core-shell rubber particles comprise one or a plurality of polybutadiene, styrene-butadiene rubber, polyacrylate, or polysiloxane.

Particular Embodiment 12 is the UV curable adhesive composition according to any one of Particular Embodiments 1 to 11, wherein shells of the core-shell rubber particles comprise one or a plurality of acrylic polymers or acrylic copolymers.

Particular Embodiment 13 is the UV curable adhesive composition according to Particular Embodiment 1, comprising: 20 to 72 parts by weight of the glass transition temperature of the reactive polyacrylate being −20 to 0° C.; 15 to 32 parts by weight of the liquid epoxy resin; 8.5 to 29 parts by weight of the solid epoxy resin, where the solid epoxy resin accounts for greater than 20 wt % based on the total weight of the epoxy resin; 1.4 to 15 parts by weight of the hydroxy-containing compound; 0.5 to 1 part by weight of the cationic photoinitiator; and 0.5 to 21 parts by weight of the core-shell rubber particles.

Particular Embodiment 14 is a UV curable adhesive tape, comprising at least one UV curable adhesive composition layer which comprises the UV curable adhesive composition according to any one of Particular Embodiments 1 to 13.

Particular embodiment 15 is the UV curable adhesive tape according to Particular Embodiment 14, further comprising a release paper or release film provided on one or two surfaces of the UV curable adhesive composition layer.

Particular Embodiment 16 is a UV cured adhesive film, comprising an adhesive composition layer formed after UV curing of the UV curable adhesive composition according to any one of the above Particular Embodiments 1 to 13.

Particular Embodiment 17 is a bonding component, comprising the UV cured adhesive film of Particular Embodiment 16 and a part bonded thereto.

EMBODIMENTS

The present disclosure is further set forth through embodiments below. Embodiments and comparative examples provided hereinafter facilitate understanding of the present disclosure and should not be understood to limit the scope of the present disclosure.

Raw materials employed in the embodiments and comparative examples are summarized in Table 1. Formulae in the embodiments and comparative examples are summarized in Table 2.

TABLE 1

| Model | Description | Supplier |
|---|---|---|
| EPIKOTE 828 | Liquid epoxy resin | Hexion |
| EPS 901 | Solid epoxy resin | Nanya, China |
| MA | Methyl acrylate | Shanghai Huayi |
| BA | Butyl acrylate | Shanghai Huayi |
| AA | Acrylic acid | Shanghai Huayi |
| GMA | Glycidyl methacrylate | Mitsubishi |
| EA | Ethyl acetate | Sinopharm Group |
| HEA | 2-Hydroxyethyl acrylate | Sinopharm Group |
| MMA | Methyl methacrylate | Sinopharm Group |
| VAZO 67 | Initiator | Dupont, U.S. |
| Polymer1 | Reactive polyacrylate, Tg −20° C. | 3M, China |
| Polymer2 | Reactive polyacrylate, Tg −20° C. | 3M, China |

TABLE 1-continued

| Model | Description | Supplier |
|---|---|---|
| Polymer3 | Reactive polyacrylate, Tg 0° C. | 3M, China |
| Polymer4 | Reactive polyacrylate, Tg −11° C. | 3M, China |
| Polymer5 | Reactive polyacrylate, Tg 10° C. | 3M, China |
| Polymer6 | Reactive polyacrylate, Tg −32° C. | 3M, China |
| DOUBLECURE 1176 | Cationic photoinitiator | Double Bond Chemical Ind., Taiwan, China |
| VORANOL 2070 | Polyol | Dow Chemical, U.S. |
| CS1 | MX257 37 wt. % polybutadiene core-shell rubber dispersed in liquid bisphenol A resin | Kaneka Corporation of Osaka, Japan |
| CS2 | MX710 40 wt. % polybutadiene core-shell rubber dispersed in polypropylene glycol having a molecular weight of 1000 g/mol | Kaneka Corporation of Osaka, Japan |
| CS3 | MX154 40 wt. % polybutadiene core-shell rubber dispersed in liquid bisphenol A resin | Kaneka Corporation of Osaka, Japan |
| CS4 | MX714 40 wt. % polybutadiene core-shell rubber dispersed in polypropylene glycol having a molecular weight of 400 g/mol | Kaneka Corporation of Osaka, Japan |
| B-Tough A2 | Toughening agent containing epoxy groups | Croda International plc, UK |
| KH560 | Silicon-containing adhesion promoter | Nanjing Alchemist Chemical Co., Ltd |

Firstly, different reactive polyacrylate Polymer 1-6 were prepared by the following synthesis examples, and the followings are solvent-based (methyl)acrylic polymers.

Synthesis Example 1

52 parts of MA, 43 parts of BA, 5 parts of GMA, 0.2 part of VAZO 67 and 150 parts of EA were mixed in a glass bottle. Nitrogen was fed therein for 2 min to remove oxygen, and the bottle was sealed. The reaction bottle was kept in the polymerization equipment at 60° C. to perform polymerization reaction for 24 h, so as to prepare the solvent-based (methyl)acrylic polymer 1 with a solid content of 40%. Tg was calculated to be −20° C. through the Fox equation, and this product was labeled as Polymer1.

Synthesis Example 2

49 parts of MA, 44.5 parts of BA, 6 parts of AA, 0.5 part of GMA, 0.2 part of VAZO 67 and 150 parts of EA were mixed in a glass bottle. Nitrogen was fed therein for 2 min to remove oxygen, and the bottle was sealed. The reaction bottle was kept in the polymerization equipment at 60° C. to perform polymerization reaction for 24 h, so as to prepare the solvent-based (methyl)acrylic polymer 2 with a solid content of 40%. Tg was calculated to be −20° C. through the Fox equation, and this product was labeled as Polymer2.

Synthesis Example 3

80 parts of MA, 15 parts of BA, 5 parts of GMA, 0.2 part of VAZO 67 and 150 parts of EA were mixed in a glass bottle. Nitrogen was fed therein for 2 min to remove oxygen, and the bottle was sealed. The reaction bottle was kept in the polymerization equipment at 60° C. to perform polymerization reaction for 24 h, so as to prepare the solvent-based (methyl)acrylic polymer 3 with a solid content of 40%. Tg was calculated to be 0° C. through the Fox equation, and this product was labeled as Polymer3.

Synthesis Example 4

60 parts of MA, 27 parts of BA, 5 parts of GMA, 8 parts of HEA, 0.2 part of VAZO 67 and 150 parts of EA were mixed in a glass bottle. Nitrogen was fed therein for 2 min to remove oxygen and, the bottle was sealed. The reaction bottle was kept in the polymerization equipment at 60° C. to perform polymerization reaction for 24 h, so as to prepare the solvent-based (methyl)acrylic polymer 4 with a solid content of 40%. Tg was calculated to be −11° C. through the Fox equation, and this product was labeled as Polymer4.

Synthesis Example 5

32 parts of MMA, 29.5 parts of MA, 32 parts of BA, 0.5 parts of GMA, 6 parts of AA, 0.2 part of VAZO 67 and 150 parts of EA were mixed in a glass bottle. Nitrogen was fed therein for 2 min to remove oxygen and, the bottle was sealed. The reaction bottle was kept in the polymerization equipment at 60° C. to perform polymerization reaction for 24 h, so as to prepare the solvent-based (methyl) acrylic polymer 5 with a solid content of 40%. Tg was calculated to be 10° C. through the Fox equation, and this product was labeled as Polymer5.

Synthesis Example 6

27 parts of MA, 60 parts of BA, 5 parts of GMA, 8 parts of HEA, 0.2 part of VAZO 67 and 150 parts of EA were mixed in a glass bottle. Nitrogen was fed therein for 2 min to remove oxygen and, the bottle was sealed. The reaction bottle was kept in the polymerization equipment at 60° C. to perform polymerization reaction for 24 h, so as to prepare the solvent-based (methyl) acrylic polymer 6 with a solid content of 40%. Tg was calculated to be −32° C. through the Fox equation, and this product was labeled as Polymer6.

The following embodiments and comparative examples are adhesive compositions and adhesive films prepared with different formulae.

Embodiment 1

109.8 g of the polymer solution from Synthesis example 1 (dry weight 43.9 g), 35.1 g of EPON 828, 8.8 g of EPS901, 1 g of 1176, 0.2 g of V2070, and 11.0 g of MX714 were mixed uniformly to prepare a mixed solution. The mixed solution was coated onto a release film and dried for 10 min at 100° C., to have a thickness of the dried film of 75 μm.

After drying, another layer of release film was covered on the surface of the adhesive film.

In Embodiments 2 to 22, the UV curable adhesive compositions and the adhesive films/adhesive tapes were all prepared according to the method in Embodiment 1, with the formulae detailed in Table 2.

In Embodiments 1 to 22, the UV curable adhesive compositions were prepared according to the formula provided in the present disclosure.

Comparative examples 1 to 12 were all prepared according to the method in Embodiments 1, with the formulae detailed in Table 2.

In Comparative examples 1 to 12, none of the UV curable adhesive compositions accords with the formula provided in the present disclosure.

TABLE 2

| | Polymer 1 | Polymer 2 | Polymer 3 | Polymer 4 | Polymer 5 | Polymer 6 | Epikote 828 | EPS 901 | DOUBLE-CURE 1176 | VORANOL 2070 | KH-560 | CS1 | CS2 | CS3 | CS4 | B-Tough A2 | Total parts by weight of epoxy resin | Parts by weight of core-shell rubber | Total parts by weight of polyols |
|---|---|---|---|---|---|---|---|---|---|---|---|---|---|---|---|---|---|---|---|
| E1 | 43.9 | | | | | | 35.1 | 8.8 | 1.0 | 0.2 | | | | | 11.0 | | 43.9 | 4.4 | 6.8 |
| E2 | 42.7 | | | | | | 34.2 | 8.5 | 0.9 | 3.0 | | | 10.7 | | | | 42.7 | 4.3 | 9.4 |
| E3 | | 70.0 | | | | | 20.0 | | 1.0 | 3.8 | | 5.2 | | | | | 23.3 | 1.9 | 3.8 |
| E4 | | 70.0 | | | | | 15.2 | | 1.0 | 3.8 | | 10.0 | | | | | 21.5 | 3.7 | 3.8 |
| E5 | | 41.3 | | | | | 28.9 | 12.4 | 0.8 | 3.3 | 0.8 | | 12.3 | | | | 41.3 | 4.9 | 10.7 |
| E6 | | 42.0 | | | | | 29.3 | 12.4 | 0.5 | 3.5 | | 12.3 | | | | | 49.4 | 4.6 | 3.5 |
| E7 | | 21.0 | | | | | 13.0 | 29.0 | 0.6 | 3.4 | | 33.0 | | | | | 62.8 | 12.2 | 3.4 |
| E8 | | 36.0 | | | | | | 10.0 | 0.6 | 3.4 | | 50.0 | | | | | 41.5 | 18.5 | 3.3 |
| E9 | | | 41.3 | | | | 41.3 | | 0.8 | 3.3 | 0.8 | | 12.4 | | | | 41.3 | 5.0 | 10.7 |
| E11 | | | | 43.0 | | | 22.5 | 12.9 | 0.8 | 7.2 | 0.8 | | | 12.6 | | | 43.0 | 5.0 | 7.2 |
| E12 | | | | 43.4 | | | 29.9 | 12.9 | 0.8 | | 0.8 | | | | 12.6 | | 42.8 | 5.0 | 7.6 |
| E13 | | | | 41.3 | | | 28.9 | 12.4 | 0.8 | 3.3 | 0.8 | | | | 12.4 | | 41.3 | 5.0 | 10.7 |
| E14 | | 50.6 | | | | | 23.6 | 10.1 | 0.8 | 1.4 | 0.8 | | | 12.6 | | | 33.7 | 5.1 | 1.4 |
| E15 | | 71.9 | | | | | 15.8 | | 0.9 | | 0.7 | | | | 10.8 | | 15.8 | 4.3 | 6.5 |
| E16 | | | | | 41.3 | | 28.9 | 12.4 | 0.8 | 3.3 | 0.8 | | | | 12.4 | | 41.3 | 5.0 | 10.7 |
| E17 | | | | | | 41.3 | 28.9 | 12.4 | 0.8 | 3.3 | 0.8 | | | | 12.4 | | 41.3 | 5.0 | 10.7 |
| E18 | | | | 44.4 | | | 31.1 | 13.3 | 0.9 | 7.2 | 0.9 | | | | 2.2 | | 44.4 | 0.9 | 8.5 |
| E19 | | | | 44.9 | | | 31.4 | 13.5 | 0.8 | 7.5 | 0.8 | | | | 1.3 | | 44.9 | 0.5 | 8.3 |
| E20 | | | | 37.3 | | | 26.1 | 11.2 | 0.7 | 1.5 | 0.7 | | 22.4 | | | | 37.3 | 9.0 | 14.9 |
| E21 | | 41.3 | | | | | 16.5 | 24.8 | 0.8 | 3.3 | 0.8 | | 12.4 | | | | 41.3 | 5.0 | 10.7 |
| E22 | | 29.3 | | | | | | 8.2 | 0.8 | 4.9 | 0.8 | 56 | | | | | 43.5 | 21 | 4.9 |
| CE1 | 46.9 | | | | | | 37.5 | 9.4 | 0.9 | 5.3 | | | | | | | 46.9 | 0.0 | 5.3 |
| CE2 | 43.1 | | | | | | 23.3 | 8.6 | 0.9 | 5.2 | | | | | | 19.0 | 31.9 | 0.0 | 5.2 |
| CE3 | | 76.2 | | | | | 19.0 | | 1.0 | 3.8 | | | | | | | 19.0 | 0.0 | 3.8 |
| CE4 | | 47.2 | | | | | 33.0 | 14.2 | 0.9 | 3.8 | 0.9 | | | | | | 47.2 | 0.0 | 3.8 |
| CE5 | | 16.0 | | | | | 30.0 | 35.0 | 0.6 | 3.4 | | 15.0 | | | | | 74.5 | 5.6 | 3.4 |
| CE6 | | | 47.2 | | | | 47.2 | | 0.9 | 3.8 | 0.9 | | | | | | 47.2 | 0.0 | 3.8 |
| CE7 | | | | 47.2 | | | 33.0 | 14.2 | 0.9 | 3.8 | 0.9 | | | | | | 47.2 | 0.0 | 3.8 |
| CE8 | | | | 45.3 | | | 31.7 | 13.6 | 0.9 | 7.6 | 0.9 | | | | | | 45.3 | 0.0 | 7.6 |
| CE9 | | 51.3 | | | | | 23.9 | 10.3 | 0.9 | | 0.9 | | | 12.8 | | | 34.2 | 5.1 | 0.0 |
| CE10 | | 78.5 | | | | | 4.1 | | 0.8 | 3.3 | 0.8 | 12.4 | | | | | 4.1 | 4.6 | 3.3 |
| CE11 | | 12.4 | | | | | 33.1 | 37.2 | 0.8 | 3.3 | 0.8 | 12.4 | | | | | 70.2 | 4.6 | 3.3 |
| CE12 | | 43.6 | | | | | 13 | 13.1 | 0.8 | 0.8 | 0.8 | 27.8 | | | | | 43.6 | 10 | 0.8 |

Testing Method:

In the present disclosure, the following tests and evaluations were performed on the samples obtained in the embodiments and comparative examples.

Testing of Peel Force After Curing:

The force needed to peel off the adhesive tape at 180° was measured in the test. Referring to the peel force testing method ASTM D3330, the adhesive tapes from the embodiments and comparative examples were tested, specifically by testing stainless steel plates with 50 μm PET films as the backing. The stainless steel plates were wiped with isopropanol three times before the test. The 75 μm thick adhesive tape (backing: 50 μm PET) was cut into 0.5×8 inches. The release film was peeled off, and the adhesive tape was attached to the stainless steel plate and rolled and pressed twice with a 2 kg force. UV irradiation (LED 365 nm, 1.5-3 $J/cm^2$) was used to trigger a curing process. Then the test sample strips were placed in a room of controlled environment (23° C./50% relative humidity) for postcuring for about 2 days and subsequently tested. A tension tester ITS Insight equipped with a 1000N weighing sensor commercially available from MTS Systems Corporation (Eden Prairie, MN) was used to evaluate the peel bonding strength. During the testing process, 30.5 cm/min (12 in./min.) cross head speed was used, and the samples were fixed in the bottom fixture, with the tail fixed in the top fixture at an angle of 180°. The average of two samples was reported in the unit of (N/mm).

The peel strength of the cured adhesive films/adhesive tapes was evaluated by the peel force. The sample is unqualified if its peel force is less than 0.20 N/mm; qualified if its peel force is greater than or equal to 0.20 N/mm; good if it its peel force is greater than or equal to 0.60 N/mm; and excellent if its peel force is greater than or equal to 0.75 N/mm.

Overlap Shear Adhesion Test after Curing:

A 2.5 cm width×10.2 cm length (1 inch×4 inches) aluminum panel was used to evaluate the overlap shear adhesion. The bonding surface of the panel was gently scraped with a 3M SCOTCE-BRITE NO. 86 scrubbing pad (green) and then gently scraped with an isopropanol wipe to remove any loose debris. Then, the release film of the adhesive film (about 50 μm thick) with PET release films on both sides was peeled off One side of the adhesive film was attached to about 0.5 inch of the upper end of the aluminum plate. The film was rolled and pressed twice with a 2 kg force, and then the redundant adhesive film was cut along the edge of the aluminum plate. One side of the adhesive film was irradiated with UV (LED 365 nm, 1.5-3 $J/cm^2$) to trigger a curing process.

After irradiation, the PET release film on the surface was peeled off immediately, and the aluminum plate on the other side was joined together face-to-face along the length thereof, to provide a overlap bonding area of about 1.3 cm length×2.5 cm width (0.5 inch×1 inch). The bonded test panel sample was kept under pressure for 48 h at 23° C. (room temperature) to ensure complete curing. A tension tester ITS Insight equipped with a 25 KN weighing sensor commercially available from MTS Systems Corporation (Eden Prairie, MN) was used to evaluate the peak overlap shear strength of the test samples at 22° C. at a separation rate of 2.5 mm/min (0.1 inch/minute). The reported value was expressed as the average of three samples.

After curing, the overlap shear strength of the adhesive films/adhesive tapes was evaluated. The sample is qualified if its overlap shear strength is greater than or equal to 4.00 MPa; good if its overlap shear strength is greater than or equal to 7.00 MPa; and excellent if its overlap shear strength is greater than or equal to 9.00 MPa.

When the performance of the adhesive films/adhesive tapes is evaluated in the present invention, the adhesive films/adhesive tapes need to have a certain peel strength and a certainoverlap shear strength at the same time. In the performance test results, if the peel force after curing is greater than or equal to 0.20 N/mm and the overlap shear strength is greater than or equal to 4.00 MPa, the sample is labeled as qualified; if the peel force after curing is greater than or equal to 0.60 N/mm and the overlap shear strength is greater than or equal to 7.00 MPa, the sample is labeled as good; and if the peel force after curing is greater than or equal to 0.75 N/mm, and overlap shear strength is greater than or equal to 9.00 MPa, the sample is labeled as excellent.

Anti-Pull-Out Impact Test after Curing:

The pull-out impact test measures the energy needed for breaking at a specified pull-out impact speed. The pull-out impact test can simulate real life impact events such as falling and can be performed according to ISO 9653:1998 "Measurement of Shear Impact Strength of Adhesives." The test is used to evaluate the impact resistance of samples.

Sample Preparation: an adhesive film with release films on both sides was cut according to the shape of the aluminum panel, then the release film on one side of the adhesive film was torn off and the adhesive film was attached to the aluminum panel. Then UV irradiation (LED 365 nm, 1.5-3 $J/cm^2$) was performed to trigger a curing process. After irradiation, the release film on the surface was peeled off immediately, and the adhesive surface was attached to the hollow aluminum frame on the other side. The bonding device was pressed to ensure good contact between the adhesive film and the aluminum plate. The bonded samples were kept under pressure for 48 h in a room of controlled environment (23° C./50% relative humidity) for postcuring. Then the test was performed with a CEAST 9340 floor-type system of U.S. Instron Corporation (Norwood, MA), in an energy transfer range design (0.3-0.45 J). A drop hammer weighing 3 kg was dropped from a height of 115 mm to hit the aluminum panel through the hollow aluminum frame. The total energy (J) required for each impacted sample to come apart was recorded. Each sample was subjected to 5 repetitions, and the results were averaged.

Evaluation of Impact Resistance: if the impact energy is less than 0.40 J, the impact resistance is evaluated as unqualified; if the impact energy is greater than or equal to 0.40 J and less than 0.70 J, the impact resistance is evaluated as qualified; if the impact energy is greater than or equal to 0.70 J and less than 1.00 J, the impact resistance is evaluated as good; and if the impact energy is greater than or equal to 1.00 J, the impact resistance is evaluated as excellent.

Table 3 summarizes conditions of the tensile impact test.

TABLE 3

| | | |
|---|---|---|
| Material | Substrate 1 | Al |
| | Substrate 2 | Al |
| Adhesive film | Cutting area | 31.1 mm × 26.1 mm |
| Test condition | Force | 42 N |
| | Time | 30 s |
| | Bonding area | 225 $mm^2$ |
| | Impact speed | 1.5 $ms^{-1}$ |
| | Impact energy | 3.37 J |
| | Temperature | 23 ± 1° C. |
| | Relative humidity | 50 ± 5% |

The peel strength, overlap shear strength and impact resistance of the UV curable adhesive tapes provided in each embodiment and comparative example were evaluated according to the method described above. Test results of the peel strength, overlap shear strength, and impact resistance of the UV curable adhesive tapes are shown in Table 4.

TABLE 4

| | Peel force after curing (N/mm) | Overlap shear strength after curing (MPa) | Impact energy after curing (J) |
|---|---|---|---|
| E1 | 0.49 | 5.70 | 0.49 |
| E2 | 0.61 | 7.40 | 0.45 |
| E3 | 1.27 | 7.40 | 0.51 |
| E4 | 1.03 | 14.03 | 0.75 |
| E5 | 0.79 | 7.60 | 1.63 |
| E6 | 0.54 | 13.96 | 0.65 |
| E7 | 0.56 | 15.26 | 0.41 |
| E8 | 0.79 | 10.48 | 0.47 |
| E9 | 0.69 | 7.90 | 0.59 |
| E11 | 0.82 | 10.30 | 0.83 |
| E12 | 0.55 | 10.50 | 0.84 |
| E13 | 0.78 | 9.40 | 1.12 |
| E14 | 0.26 | 5.0 | 0.92 |
| E15 | 0.96 | 5.7 | 1.09 |
| E16 | 0.4 | 6.7 | 1.10 |
| E17 | 0.5 | 11.4 | 1.00 |
| E18 | 0.88 | 9.5 | 0.95 |
| E19 | 0.8 | 11.4 | 0.72 |
| E20 | 0.94 | 10.4 | 1.45 |
| E21 | 0.72 | 8.6 | 1.1 |
| E22 | 1.06 | 5.1 | 1.67 |
| CE1 | 0.3 | 5.20 | 0.25 |
| CE2 | 0.34 | 5.40 | 0.30 |
| CE3 | 1.13 | 5.40 | 0.35 |
| CE4 | 0.05 | 4.20 | 0.65 |
| CE5 | 0.01 | 9.28 | 0.10 |
| CE6 | 0.04 | 4.20 | Not measured |
| CE7 | 0.08 | 2.80 | Not measured |
| CE8 | 0.03 | 3.20 | Not measured |
| CE9 | 0.01 | 2.5 | 0.14 |
| CE10 | Not measured | 2.1 | Not measured |
| CE11 | 0.01 | Not measured | Not measured |
| CE12 | 0.09 | 4.8 | 0.24 |

According to Embodiments 1 to 22, as shown in Tables 3 and 4, four different reactive polyacrylates Polymer1-6 were used in the formula. When the content of the reactive polyacrylate was 21-71.9 parts, the content of the epoxy resin was 15.8-63 parts, the content of core-shell rubber was 0.5-21 parts, the content of hydroxy-containing compound was 1.4 to 14.9 parts, and the content of the cationic photoinitiator was 0.02-3 parts, all prepared adhesive compositions had the peel force after curing greater than 0.20 N/mm and at the same time had the overlap shear strength after curing greater than 4.00 Pa, i.e., both good peel strength and overlap shear strength at the same time, that is, better comprehensive bonding strength. In addition, the impact energies of adhesive composition after curing were all greater than or equal to 0.40 J, which conforms to the purpose of the present invention.

In Comparative examples 4 to 12, the peel strength and overlap shear strength of the corresponding adhesive compositions after curing could not meet the requirements of this disclosure at the same time because the formula did not contain core-shell rubber. In Comparative examples 1 to 3, the the impact energies of adhesive composition after curing were less than 0.40 J.

A liquid toughening agent was used to replace the core-shell rubber in Comparative example 2. Although the liquid toughening agent was compatible with the system, both the peel strength and impact resistance were worse than Embodiment 1 having the same contents of other components but employing core-shell rubber. The liquid toughening agent could not improve the peel strength and overlap shear strength of the prepared adhesive compositions after curing at the same time and resulted in worse impact resistance.

As compared with Embodiment 3 and Embodiment 4, in Comparative example 3, because the formula did not have core-shell rubber particles, although the peel strength was very high, the impact resistance was poor.

In comparative example 5 or 11, the content of epoxy resin was too high and the content of reactive polyacrylate was too low. Although an appropriate amount of core-shell rubber particles were added, the overlap shear strength and peel strength of the adhesive compositions after curing could not be improved at the same time, and the impact resistance was very poor, which could not meet the requirements of this disclosure. Comparative example 5 also describes the difference between the formula of the UV cured adhesive tape and that of the liquid epoxy structural adhesive, i.e., the UV cured adhesive tape's surface wettability for the surface to be bonded was not as good as that of the liquid epoxy structural adhesive, and the adhesive tape's surface wettability for the surface to be bonded depends on the contents of the epoxy resin and reactive polyacrylate at the same time. If a suitable epoxy resin and reactive polyacrylate system is not selected, the peel strength, overlap shear strength, and the impact resistance of the adhesives will not necessarily be improved even if core-shell rubber is added.

The formulae in Comparative example 4, and Comparative example 6 did not contain core-shell rubber particles, and the prepared adhesive compositions failed to have both qualified peel strength, overlap shear strength and impact resistance at the same time.

It can be seen from Embodiment 3 and Embodiment 4 that, when only liquid epoxy was contained in a formula, the prepared adhesive had both excellent peel strength and overlap shear strength after curing, so as to meet requirements of the present invention, and good impact resistance as well. In addition, when the content of core-shell rubber particles was more than or equal to 3.7 parts by weight, the peel strength and overlap shear strength after curing were excellent, and the impact resistance was also improved.

It can be seen from Embodiment 6 and Embodiment 5 that, when the formula was controlled to contain 36 to 45 parts by weight of the reactive polyacrylate, with the Tg thereof in the range of −20 to 0° C.; 21 to 32 parts by weight of liquid epoxy resin; 8.5 to 29 parts by weight of the solid epoxy resin, the ratio by mass of the solid epoxy based on the total epoxy resin being greater than or equal to 20 wt % and 3.3 to 11 parts by weight of the hydroxy-containing compound; 0.5 to 1 part by weight of the cationic photoinitiator; and 3.7 to 21 parts by weight of the core-shell rubber particles, the peel strength and overlap shear strength after curing of the adhesive composition prepared were good, and the adhesive composition was capable of having both good peel strength and overlap shear strength at the same time, and the impact resistance was excellent.

It can be seen from Embodiment 12 and Embodiment 13 that the peel strength, overlap shear strength and impact resistance after curing of the prepared adhesive composition can be all improved by further increasing the content of polyols in the formulae with similar parameters of epoxy resin, reactive polyacrylate, and core-shell rubber particles. Polyols not only act as chain transfer agents in the system, but also contribute to the uniform dispersion of core-shell rubber particles in the adhesive tape system.

Clearly, the above embodiments the present disclosure are merely embodiments for the purpose of clearly illustration of present disclosure, rather than limitations to the embodiments of present disclosure. For those of ordinary skill in the art, other different forms of modifications and variations may also be made on the basis of the illustration described above. All of embodiments cannot be exhaustively exemplified herein. Any apparent modification or variation belonging to the extension from the technical solution of the present disclosure still falls within the scope protected by the present disclosure.

The invention claimed is:

1. A UV curable adhesive composition, comprising:

20 to 72 parts by weight of reactive polyacrylate;

15 to 63 parts by weight of epoxy resin, wherein the epoxy resin comprises a liquid epoxy resin and a solid epoxy resin;

0.5 to 21 parts by weight of core-shell rubber particles;

1.4 to 15 parts by weight of a hydroxy-containing compound; and an effective amount of a cationic photoinitiator.

2. The UV curable adhesive composition according to claim 1, wherein the content of the solid epoxy resin is 8 to 29 parts by weight.

3. The UV curable adhesive composition according to claim 2, wherein the content of the liquid epoxy resin is less than or equal to 32 parts by weight.

4. The UV curable adhesive composition according to claim 1, wherein the glass transition temperature of the reactive polyacrylate is −35 to 10° C.

5. The UV curable adhesive composition according to claim 1, wherein the glass transition temperature of the reactive polyacrylate is −20 to 0° C.

6. The UV curable adhesive composition according to claim 1, wherein the content of the cationic photoinitiator is 0.5 to 1 part by weight.

7. The UV curable adhesive composition according to claim 1, wherein shells of the core-shell rubber particles comprise one or a plurality of acrylic polymers or acrylic copolymers.

8. The UV curable adhesive composition according to claim 1, comprising:

20 to 72 parts by weight of the reactive polyacrylate, the glass transition temperature of the reactive polyacrylate being −20 to 0° C.;

15 to 32 parts by weight of the liquid epoxy resin;

8.5 to 29 parts by weight of the solid epoxy resin, wherein the solid epoxy resin accounts for greater than 20 wt % based on the total weight of the epoxy resin;

1.4 to 15 parts by weight of the hydroxy-containing compound;

0.5 to 1 part by weight of the cationic photoinitiator; and 0.5 to 21 parts by weight of the core-shell rubber particles, wherein the core-shell rubber particles have a polybutadiene core.

9. A UV curable adhesive tape, comprising at least one UV curable adhesive composition layer, the UV curable adhesive composition layer comprising the UV curable adhesive composition according to claim 1.

10. The UV curable adhesive tape according to claim 9, wherein the UV curable adhesive tape further comprises a release paper or a release film provided on one or two surfaces of the UV curable adhesive composition layer.

11. A UV cured adhesive film, the UV cured adhesive film comprising an adhesive composition layer formed after UV curing of the UV curable adhesive composition of claim 1.

12. The UV curable adhesive composition according to claim 1, wherein cores of the core-shell rubber particles comprise one or a plurality of polybutadiene, styrene-butadiene rubber, polyacrylate or polysiloxane.

13. The UV curable adhesive composition according to claim 1, wherein the core-shell rubber particles have a polybutadiene core.

14. The UV curable adhesive composition according to claim 1, wherein the solid epoxy resin accounts for greater than 10 wt. % based on the total weight of the epoxy resin.

15. The UV curable adhesive composition according to claim 1, wherein the composition comprises at least 36 parts by weight to at most 70 parts by weight of reactive polyacrylate.

16. The UV curable adhesive composition according to claim 1, wherein the composition comprises at least 36 parts by weight to at most 45 parts by weight of reactive polyacrylate.

17. The UV curable adhesive composition according to claim 1, wherein the composition comprises 0.9 to 21 parts by weight of core-shell rubber particles.

18. The UV curable adhesive composition according to claim 1, wherein the composition comprises 3 to 15 parts by weight of the hydroxy-containing compound.

19. The UV curable adhesive composition according to claim 1, wherein the solid epoxy resin is 8 to 29 parts in the UV curable adhesive composition.

20. The UV curable adhesive composition according to claim 1, comprising:

36 to 70 parts by weight of reactive polyacrylate;

8.5 to 29 parts by weight of the solid epoxy resin;

0.9 to 21 parts by weight of core-shell rubber particles; and 3 to 15 parts by weight of the hydroxy-containing compound.

* * * * *